United States Patent Office 3,146,242
Patented Aug. 25, 1964

3,146,242
PROCESS FOR THE PREPARATION OF SULTONES
Karl-Josef Gardenier and Heinz Kothe, both of Dusseldorf-Holthausen, Germany, assignors to Henkel & Cie G.m.b.H., Dusseldorf-Holthausen, Germany, a corporation of Germany
No Drawing. Filed May 3, 1961, Ser. No. 107,292
Claims priority, application Germany May 21, 1960
6 Claims. (Cl. 260—327)

This invention relates to a method for preparing sultones from organic hydroxy-sulfonic acids by treating them with a strong acid less volatile than the sultone to be produced at elevated temperatures and reduced pressures and distilling the sultone from the reaction mixture.

In accordance with a known prior art process, sultones are prepared by splitting off water from organic hydroxy-sulfonic acids at reduced pressure and at elevated temperatures and, as a rule, thereafter distilling the sultone out of the reaction mixture. For the preparation of sultones by this method on an industrial scale, primarily two raw materials are suitable, namely, tetrahydrofuran and allyl alcohol.

It is well known that tetrahydrofuran may readily be transformed into 4-chloro-butanol-1. This compound is then transformed with an alkali metal sulfite into an alkali metal salt of 4-hydroxybutane-sulfonic acid-1. For the preparation of the sultone, this salt was heretofore first transformed into the free hydroxybutane-sulfonic acid with the aid of a strong acid, such as hydrochloric acid, or with the aid of an ion exchanger. The hydroxybutane-sulfonic acid was then used for the preparation of butane-sultone-1,4 by the above-described method.

A second industrially important method for the preparation of sultones from hydroxy-sulfonic acid starts from allyl alcohol. In accordance with the process of Karash, which was later improved by Helberger, an alkali metal bisulfite, such as sodium bisufite, is condensed with the double bond of the allyl alcohol in the presence of oxygen or peroxides to obtain an alkali metal salt of 3-hydroxypropane-1-sulfonic acid in admixture with sulfite and sulfate. The salt of the 3-hydroxypropane-1-sulfonic acid was heretofore first freed from the inorganic salts. Subsequently, it was transformed with the aid of hydrochloric acid or with the aid of an ion exchanger into the free hydroxypropane-sulfonic acid, from which the propane-sultone was prepared.

The above remarks show that the preparation of sultones from the initially obtained alkali metal salts of hydroxy-sulfonic acids, which are contaminated by inorganic salts, is an involved operation. For these reasons the price of sultones has been heretofore so high that the employment of this class of substances, which is extremely interesting from the point of view of preparation and with the aid of which water-solubilizing groups can be introduced into a variety of compounds under very mild conditions and with good yields, was contemplated only for the synthesis of relatively valuable substances.

It is an object of this invention to provide a process for preparing sultones from ammonium or alkali metal salts or organic hydroxy-sulfonic acids directly in a one step process.

It is a further object of this invention to provide a process for preparing sultones from the salts of organic hydroxy-sulfonic acids as raw materials without the necessity of extensive purification of the salts.

These and other objects of our invention will become apparent as the description thereof proceeds.

Our invention is a process which considerably simplifies and lowers the cost of the preparation of sultones on an industrial scale. The novel process makes it possible to prepare sultones in a single step operation from salts of organic hydroxy-sulfonic acids without the necessity of specially purifying these salts and without having to transform the salts into the free hydroxy-sulfonic acids in a separate process step.

The novel process is characterized in that alkali metal salts or amonium salts of organic hydroxy-sulfonic acids are admixed with strong acids which are less volatile than the sultone to be prepared, especially with concentrated sulfuric acid, and distilling the sultone out of the mixture at reduced pressure and elevated temperature. It is advantageous to add the acid in such a quantity that at the end of the reaction, i.e., after distilling off the sultone, an acid salt or mixture is left behind which is liquid at the prevailing temperatures.

In this manner the sultone is obtained with excellent yields. This discovery was surprising because in the prior art process the presence of even relatively small amounts of free sulfuric acid, which are present in the hydroxy-propane-sulfonic acid, for example, create substantial difficulties during the conversion into the sultone. More particularly, the presence of sulfuric acid often causes a decomposition which is connected with strong foaming, so that the distillation of the sultone is made considerably more difficult.

Suitable starting materials for the process according to the present invention are alkali metal and ammonium salts of those organic hydroxy-sulfonic acids which at elevated temperatures convert into sultones, while splitting off water. Particularly suitable are the alkali metal salts of those hydroxyalkane-sulfonic acids wherein there are at least three, preferably three to four, carbon atoms between the hydroxyl group and the sulfonic acid group. Examples of such sulfonic acids are 1-hydroxypropane-sulfonic acid-3, 1-hydroxybutane-sulfonic acid-4, 1-hydroxybutane-sulfonic acid-3, 1-hydroxyhexane-sulfonic acid-4, 4-hydroxy-2-methylpentane-sulfonic acid-2, 3-hydroxyoctane-sulfonic acid-1, benzyl alcohol-o-sulfonic acid, 2-hydroxymethyl-naphthalene-sulfonic acid-3 and the like. It is, however, also possible to use salts of hydroxy-sulfonic acids as starting materials wherein there are more than four carbon atoms between the hydroxyl group and the sulfonic acid radical, such as salts of 1-hydroxyhexane-sulfonic acid-6 or 1-hydroxyoctane-sulfonic acid-8. In such cases, an isomerization may occur during the sultone formation so that, instead of the sultones corresponding to the sulfonic acids used as starting materials, sultones with 5- or 6-membered rings are partially or entirely formed.

The above-mentioned acids are used in the form of their alkali metal or ammonium salts. Because of the low melting points of ammonium bisulfate or mixtures of alkali metal and ammonium bisulfate, the ammonium salts or their mixtures with alkali metal salts of the above sulfonic acids are in many cases preferred as starting materials for the process according to the present invention.

It is not necessary to use the salts serving as the starting materials in pure form. They may be contaminated with inorganic salts, for example. In general, however, it is recommended previously to separate larger amounts of halides which may be present, such as sodium chloride, in order to avoid an unnecessary evolution of hydrogen halide. In addition, mixtures of salts of various sulfonic acids may also be used as starting materials.

In accordance with the present invention, the above-mentioned alkali metal or ammonium salts of organic hydroxy-sulfonic acids are reacted with strong acids which are less volatile than the sultones to be prepared. Primarily suitable for this purpose is sulfuric acid. However, the process may also be carried out with the aid of other acids, such as phosphoric acid, or with the aid of organic sulfonic acids.

If sulfuric acid is used, the acid is advantageously added in an amount such that after the reaction is completed, i.e., after the sultone is distilled off, the reaction mixture consists essentially of bisulfate. In this manner the mixture is made to remain liquid until the end of the reaction, particularly if the starting materials are ammonium salts or mixtures of alkali metal and ammonium salts. An excess of sulfuric acid is not harmful.

If other strong acids are employed, an excess of the particular acid is also used and it is always endeavored to keep the reaction mixture liquid until the end of the reaction.

The reaction according to the invention is carried out under reduced pressure which is advantageously less than 50 mm. Hg, preferably at a pressure less than 20 mm. Hg. The reduced pressure is selected to be such that the sultone formed by the reaction can readily be distilled out of the reaction mixture. The reaction temperature is generally above 120° C., preferably between about 140° and 200° C. In general, it is advantageous to select the pressure as well as the temperature as low as possible in order to avoid a discoloration of the sultone which is formed. However, under a good vacuum the temperature may be increased to more than 250° C. without the occurrence of an appreciable decomposition.

The process may readily be carried out in continuous fashion, for example, by letting a melt consisting of sulfuric acid and the ammonium salt of hydroxypropane-sulfonic acid flow through a reaction tube which is heated to 150° to 200° C. and continuously distilling off the sultone formed thereby under a good vacuum. An especially pure product is obtained in this manner because the residence time of the hydroxy-sulfonic acid or the sultone in the heated zone is relatively short. In similar fashion the process may also be carried out under particularly mild conditions with the aid of a thin-layer-evaporator or a descending-film-evaporator.

The following examples are set forth to further illustrate our invention and to enable persons skilled in the art to better understand and practice our invention and are not intended to be limitative.

*Example I*

32.4 gm. of the sodium salt of 1-hydroxypropane-sulfonic acid-3 were admixed in a 250 cc. round bottom flask with 20.4 gm. of concentrated (96 to 98%) sulfuric acid. The flask was connected to a distillation apparatus, such as is customarily used in the laboratory for vacuum distillations, and was heated under a vacuum of 0.5 to 2 mm. Hg to an internal temperature of 150 to 190° C. 22.6 gm. of water-clear propanesultone distilled over in the course of about 30 minutes. The reaction mixture solidified toward the end of the distillation.

*Example II*

A mixture of 39.25 gm. of the ammonium salt of 1-hydroxypropane-sulfonic acid-3 and 25.0 gm. concentrated sulfuric acid was heated to 150° to 175° C. under a pressure of 0.5 to 2 mm. Hg in the same manner as described in Example I. 28.7 gm. of water-clear 1,3-propanesultone distilled over in the course of about 25 minutes. The reaction mixture remained liquid after termination of the reaction.

*Example III*

A mixture of 35.6 gm. of the potassium salt of 1-hydroxypropane-sulfonic acid-3 and 20.0 gm. of concentrated (96 to 98%) sulfuric acid was heated to 150° to 200° C. at a pressure of about 1 mm. Hg in the same manner as described in Example I. 22.0 gm. of propane-sultone distilled over in the course of about 30 minutes. The reaction mixture solidified toward the end of the reaction.

*Example IV*

82.7 gm. of a mixture of the ammonium salts of 1,3- and 1,4-hydroxybutane-sulfonic acid, together with 48.3 gm. of concentrated sulfuric acid, were heated to 150 to 175° C. at a pressure of 0.5 to 2 mm. Hg in the same manner as described in Example I. 61.9 gm. of butane-sultone distilled over in the course of about 20 minutes. The reaction mixture remained liquid even after termination of the reaction.

*Example V*

A glass reaction tube 2 meters long and having a diameter of 15 mm. was heated to 175° C. and then a melted mixture of 157 gm. of the ammonium salt of 1-hydroxypropane-sulfonic acid-3 and 100 gm. concentrated sulfuric acid was introduced dropwise into the tube over a period of one hour. A vacuum of 1 mm. Hg was maintained in the tube during this period. 112 gm. of propane-sultone distilled over. The molten reaction mixture leaving the tube consisted essentially of ammonium bisulfate.

*Example VI*

A mixture of 31.4 gm. of the ammonium salt of 1-hydroxypropane-sulfonic acid-3, 64.8 gm. of the sodium salt of 1-hydroxypropane-sulfonic acid-3 and 60.0 gm. concentrated sulfuric acid was heated at 175° C. at a pressure of about 0.5 mm. Hg in the manner described in Example I. 66.8 gm. of propanesultone distilled over in the course of one hour. The molten reaction mixture was still liquid even after termination of the reaction.

*Example VII*

A mixture of 39.2 gm. of the ammonium salt of 1-hydroxypropane-sulfonic acid-3 and 104 gm. of β-naphthalenesulfonic acid was heated to 190° C. at a pressure of about 0.5 mm. Hg in the manner described in Example I. 28.0 gm. of propanesultone distilled over in the course of one hour.

*Example VIII*

A mixture of 78.5 gm. of the ammonium salt of 1-hydroxypropane-sulfonic acid-3 and 49.0 gm. of concentrated phosphoric acid was heated to 190° C. at a pressure of 0.2 to 0.5 mm. Hg in the manner described in Example I. 53.5 gm. propanesultone distilled over in the course of about one hour.

While we have set forth certain specific examples and preferred modes of practice of our invention, we wish it to be understood that we do not intend to be limited thereby and that various changes and modifications may be made in the invention without departing from the spirit of the disclosure or the scope of the appended claims.

We claim:

1. A process for the preparation of sultones, which comprises treating salts of organic hydroxy-sulfonic acids, wherein there are at least 3 carbon atoms between the hydroxyl group and the sulfonic acid group, and wherein any unsaturation is benzenoid, said salts being selected from the group consisting of alkali metal salts, ammonium salts, and a mixture of alkali metal salts and ammonium salts, at elevated temperatures between about 120 to 250° C. and a pressure of less than 50 mm. Hg with a strong acid which is less volatile than the sultone to be produced, said strong acid being selected from the group consisting of concentrated sulfuric acid, phosphoric acid and organic sulfonic acids, and distilling the sultone out of the reaction mixture.

2. A process for the preparation of sultones, which comprises treating salts of organic hydroxy-sulfonic acids wherein there are at least 3 carbon atoms between the hydroxyl group and the sulfonic acid group, and wherein any unsaturation is benzenoid, said salts being selected from the group consisting of alkali metal and ammonium salts and a mixture of alkali metal salts and ammonium salts at elevated temperatures between about 120 to 250° C. and a pressure of less than 50 mm. Hg with concentrated sulfuric acid in an amount such that the residue after completion of the reaction consists essentially of bisulfate, and distilling the sultone out of the reaction mixture.

3. The process of claim 2 wherein the hydroxy-alkane-sulfonic acid is 1-hydroxypropane-sulfonic acid-3.

4. The process of claim 2 wherein the hydroxy-alkane-sulfonic acid is 1-hydroxybutane-sulfonic acid-4.

5. A process for the preparation of sultones, which comprises treating salts of hydroxy-alkane-sulfonic acids wherein there are at least 3 carbon atoms between the hydroxyl group and the sulfonic group, selected from the group consisting of alkali metal salts, ammonium salts, and a mixture of alkali metal salts and ammonium salts at elevated temperatures between about 140 and 200° C. and a pressure less than about 20 mm. Hg with concentrated sulfuric acid in an amount such that the residue after completion of the reaction consists essentially of bisulfate, and distilling the sultone out of the reaction mixture.

6. A process for the preparation of propane-sultone which comprises treating the ammonium salt of 1-hydroxy-propane-sulfonic acid-3 at elevated temperatures between about 140° and 200° C. and a pressure less than about 20 mm. Hg with concentrated sulfuric acid, in an amount such that the residue after the reaction consists essentially of bisulfate and distilling the propanesultone out of the reaction mixture.

References Cited in the file of this patent
UNITED STATES PATENTS 2,799,702     Gaertner _____ July 16, 1957

OTHER REFERENCES

Theilheimer: Synthetic Methods of Organic Chemistry, vol. 11, p. 280 (1957).